United States Patent [19]
Fette et al.

[11] Patent Number: 6,052,600
[45] Date of Patent: Apr. 18, 2000

[54] SOFTWARE PROGRAMMABLE RADIO AND METHOD FOR CONFIGURING

[75] Inventors: Bruce Alan Fette, Mesa; Jack H. Millman, Scottsdale, both of Ariz.

[73] Assignee: Motorola, Inc., Schaumburg, Ill.

[21] Appl. No.: 09/197,777

[22] Filed: Nov. 23, 1998

[51] Int. Cl.[7] ...................................................... H04Q 7/20
[52] U.S. Cl. .......................... 455/509; 455/418; 455/419; 455/414; 455/510; 455/515; 455/517; 455/186.2; 370/329; 379/93.02
[58] Field of Search .............................. 455/186.1, 186.2, 455/185.1, 408, 418, 419, 519, 509, 510, 512, 514, 515, 517, 435; 370/329; 379/93.02

[56] References Cited

U.S. PATENT DOCUMENTS

| | | | |
|---|---|---|---|
| 4,924,378 | 5/1990 | Hershey et al. | 364/200 |
| 5,422,682 | 6/1995 | Nakade et al. | 455/186.2 |
| 5,490,216 | 2/1996 | Richardson, III | 380/4 |
| 5,553,314 | 9/1996 | Grube et al. | 455/54.2 |
| 5,603,084 | 2/1997 | Henry, Jr. et al. | 455/186.1 |
| 5,729,537 | 3/1998 | Billstrom | 370/329 |
| 5,751,813 | 5/1998 | Dorenbos | 380/49 |
| 5,828,358 | 10/1998 | Monta et al. | 345/133 |
| 5,896,566 | 4/1999 | Averbuch et al. | 455/186.1 |
| 5,926,756 | 7/1999 | Piosenka et al. | 455/418 |
| 5,930,704 | 5/1999 | Kay | 455/419 |

OTHER PUBLICATIONS

A manual entitled "Modular Multifunction Information Transfer System Forum" (MMITS Forum) TechnicaL Report 1.2, Architecture and Elements of Software Defined Radio Systems as Related to Standards, Jul. 1998.

*Primary Examiner*—Fan S. Tsang
*Assistant Examiner*—Simon D. Nguyen
*Attorney, Agent, or Firm*—Gregory J. Gorrie

[57] ABSTRACT

A software programmable radio (200) receives information to configure a reconfigurable resource (208) to perform an operation based on the information. A processor (210) within the reconfigurable resource performs a software program in accordance with the operation, such as a waveform for communicating via a spread spectrum technique. The method includes the steps of checking (304) for a valid license granted to the radio to determine when the radio is authorized for use in the network. A controller (204) configures the radio to perform the operation based on the information.

16 Claims, 3 Drawing Sheets

SOFTWARE PROGRAMMABLE RADIO AND METHOD FOR CONFIGURING

FIELD OF THE INVENTION

This invention relates in general to the field of wireless communications, in particular to radios and more particularly to software programmable radios.

BACKGROUND OF THE INVENTION

Existing cellular radios commonly communicate via a single cellular service, for example, analog, Personal Communication Service (PCS), Code Division Multiple Access (CDMA), Time Division Multiple Access (TDMA), Global System for Mobilization (GSM), or Iridium service. A radio typically communicates by generating and receiving a waveform that is fixed throughout the lifetime of the radio. A problem with such a radio is that when a user moves from a "home" location to a "remote" location, the radio is not easily configurable to communicate at the remote location. For example, when a user travels overseas, the user's radio doesn't support a service that is available at the home location. In such situations, the user may need to, for example, rent or purchase a radio that is compatible with local communication equipment.

Another problem is when existing radios need to update or receive a software application (e.g., wireless email, operating system). Typically, a radio is taken into a service center to update or receive an application so that the radio can provide a service associated therewith. This is time consuming and expensive.

Frequently, users of radios such as police, federal agency, and military encounter difficulties when attempting to interoperate communication equipment. For example, when a representative from the Federal Bureau of Investigation (FBI) travels to a remote location, the representative may need to borrow equipment from regional officials to communicate with local police and fire services. Similarly, in the military community, a Navy ship may desire, for example, to make and receive phone calls at a port at a remote location via local infrastructure equipment. Frequently, existing systems do not allow interoperability between military and local communication equipment. So a problem with such systems is interoperability between communications equipment. Another problem with such systems are the additional complexity and expense to "translate" from one communication technique to another.

Another problem with existing radios is with verifying when a radio meets a predetermined specification for communications. For example, when the Federal Communication Commission (FCC) needs to validate that a radio meets a predetermined specification (e.g., noninterference, splatter, noise, out-of-band noise), a method to verify the specification is needed to ensure a radio operates according to regulatory restriction. In other words, the FCC needs to verify the performance for different types of radios. Additionally, when a radio is modified by a technician, the FCC needs to verify performance parameters for the radio. So, a problem with existing technology is the verification of a radio operation within predetermined specifications when performing communication operations.

Thus, what is needed are a radio and method to perform radio communications at a remote location. What is also needed are a radio and method to communicate different waveforms. Also, what is needed are a radio and method to simply and inexpensively update or receive a software application. What is also needed is a radio that interoperates with various communications equipment. What is also needed are a radio and method for communicating via various communication techniques. Also what is needed are a radio and method for verifying when the radio will operate at predetermined specifications when performing communication operations.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures and:

The exemplification set out herein illustrates a preferred embodiment of the invention in one form thereof, and such exemplification is not intended to be construed as limiting in any manner.

DETAILED DESCRIPTION OF THE PREFERRED EMBODIMENT

The present invention provides a radio for communicating in a wireless network. The network primarily includes at least one radio, at least one base station, and a server. A radio receives information to configure a reconfigurable resource to perform an operation. Preferably, a processor within the reconfigurable resource performs a software program in accordance with the operation. The method includes the steps of checking for a valid license granted to the radio to determine when the radio is authorized for use in the network. The radio receives the information from a server, and a controller configures the radio to perform the operation based on the information.

The present invention further provides a software programmable radio and method to perform radio communications at a remote location. The present invention also provides a radio and method to communicate different waveforms. The present invention also provides a method to simply and inexpensively update and receive a software application. The present invention further provides a radio that interoperates with various communications equipment. The present invention also provides a radio and method for communicating via various communication techniques. The present invention also provides a radio and method for verifying when the radio will operate at predetermined specifications when performing communication operations.

A "radio" is defined herein to mean a software programmable wireless communication apparatus. A radio may receive, transmit, or both using either simplex or duplex communication techniques. A radio can be, for example, a cellular phone, a two-way radio, a personal digital assistant or computer with a modem, and a pager. A "base station" is defined herein to mean a communication apparatus having at least one air interface to a radio as defined above, and at least one air or wired interface to communication infrastructure equipment. One example of a base station is a cellular base station. A "home location" is defined herein to mean a predetermined geographic location where a user of a radio ordinarily receives service for the radio. Typically, a home location for a user's radio is also termed the "area of service" for the radio. Examples of a home location can be, for example, a city, a county, a state, a country, a continent, etc. A "remote location" is defined herein to mean a predetermined geographic location where a user of a radio ordinarily does not receive service for the radio. Typically, a remote location for a user's radio is also termed "outside a service area" for the radio. For example, when a user's home location is New York City but the user is traveling to Europe, Europe is considered the remote location for the user's radio. In other words, a predetermined service for the radio at the home location (e.g., Personal Communication Service) is not compatible with service at the remote location (e.g., Global System for Mobilization). A "grant" is defined herein to mean data that is conveyed to a radio to indicate that the radio has permission to use software in accordance with a software license.

Figure 1:
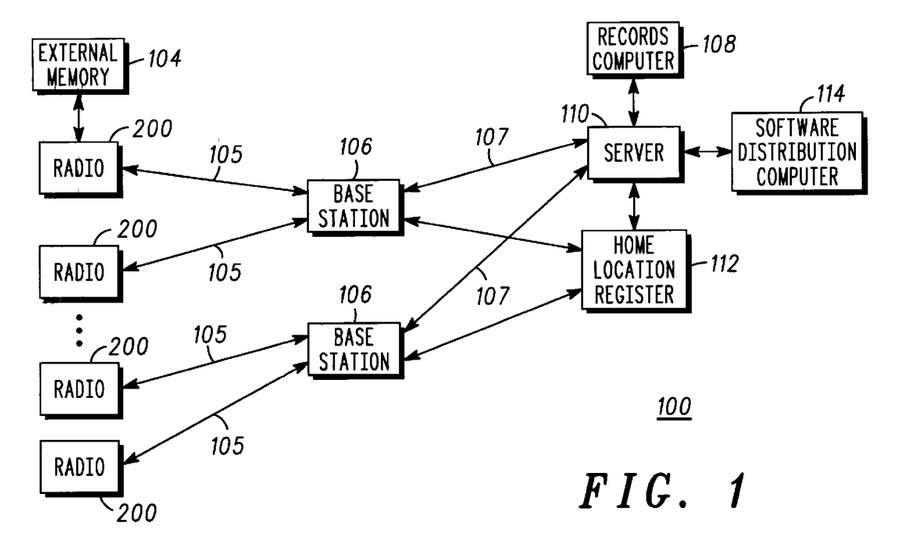
FIG. 1 shows a simplified system level block diagram for a wireless network in which the present invention may be produced.

FIG. 1 shows a simplified system level block diagram for a wireless network in which the present invention may be provided. In a preferred embodiment, wireless network 100 includes at least one of each of the following: radio 200, base station 106, server 110, records computer 108, home location register 112, and software distribution computer 114. Radio 200 communicates with base station 106 via wireless communication channel 105. Base station 106 communicates with server 110 via communication channel 107.

In a preferred embodiment, radio 200 is configured to operate within network 100. Preferably, radio 200 transmits a request through wireless communication channel 105 for information to configure radio 200. Base station 106 receives the request through wireless communication channel 105 and passes the request to server 110. Server 110 retrieves the information from a database (not shown) and conveys the information to base station 106 through communication channel 107. Radio 200 receives the information through wireless communication channel 105 and performs configuration operations based on the information.

Information may include, for example, a software program, a software defined waveform, a license for a software program or a software defined waveform, an operating system, an advertisement, a bit pattern to configure an FPGA, a software agent, a software object, a software applet, and a configuration file such as, for example, FCC communication specifications (e.g., noninterference, splatter, noise, out-of-band noise) associated with a software defined waveform.

Configuration operations include, for example, loading a software program, loading a software defined waveform, loading a grant of rights to use software in accordance with a software license, and loading a configuration file that describes, for example, FCC communication specifications associated with a software defined waveform.

In a preferred embodiment, wireless network 100 further includes records computer 108, software distribution computer 114, and home location register 112, each coupled to server 110. Records computer 108 tracks usage data associated with, for example, software programs downloaded to radio 200. Records computer 108 further tracks usage data such as, for example, software defined waveforms that are associated with a user's radio. In an embodiment where records computer 108 is used for a commercial application (e.g., cellular telephony), records computer 108 generates records information that includes, for example, billing data associated with phone calls.

In another embodiment, server 110 determines when usage data associated with a user's radio is properly allocated. For example, when a United States law enforcement official travels to a remote location, the official can request access to a communication system for local police and fire departments. In this embodiment, server 110 retrieves records information from computer 108 to determine when the official is granted access to the local communication system. Other records information can include, for example, a length of time a user's radio is allowed access to a remote system, hardware (e.g., radio) model numbers supported by a wireless network, software program types and version numbers supported by a wireless network, and software programmable waveforms available for a user's radio.

Home location register 112 is preferably a database for storing data about a user and the user's radio. For example, data stored in home location register 112 includes phone number, geographic boundaries within which a user's radio is allowed access (e.g., city, county, state lines). Preferably, server 110 uses data stored in home location register 112 to verify that a radio requesting information is entered into a user database for the network.

In a preferred embodiment, software distribution computer (SDC) 114 is coupled to server 110. SDC 114 is a computer for processing requests from server 110. Radio 200 sends messages to server 110 to request software program updates from software vendors through SDC 114. For example, when a user of radio 200 needs to update a version of an operating system, the user sends a message from radio 200 to server 110 through base station 106. Server 110 queries SDC 114 for the updates to the software program. SDC 114 services the request by returning the updates to radio 200 via server 110 and base station 106. Radio 200 loads the updates received from SDC 114. Preferably, in this example, records computer 108 records the transaction and determines when the user accepts billing fees associated with receiving the updates. Additionally, in one embodiment, control software performed by radio 200 determines when a valid software license is granted to the radio to enable use of the updates. In another embodiment, server 110 performs the check to determine when radio 200 has a valid software license granted for the updates.

Figure 2:
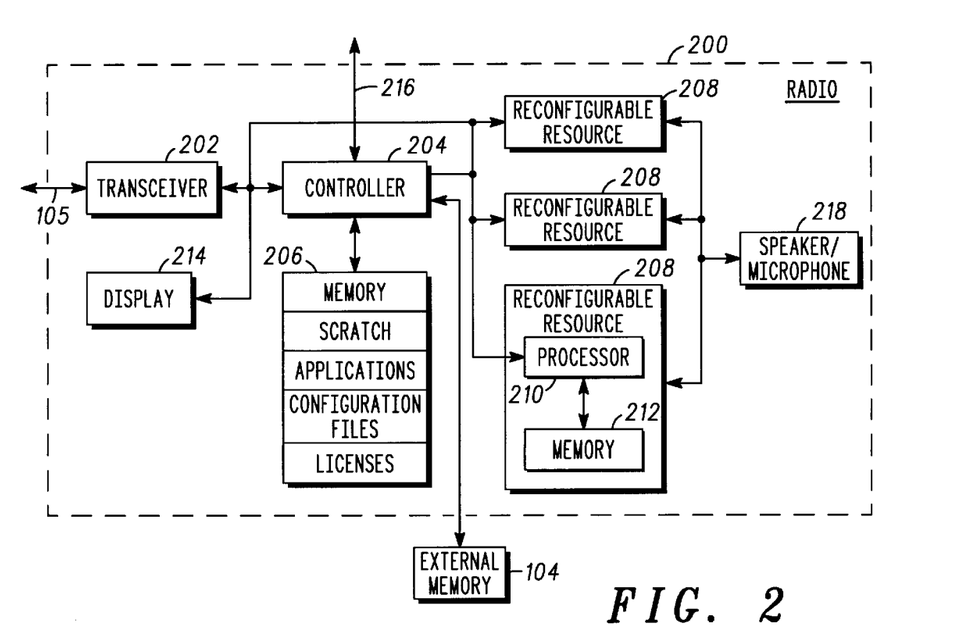
FIG. 2 shows a simplified block diagram of a software programmable radio in accordance with a preferred embodiment of the present invention.

FIG. 2 shows a simplified block diagram of a software programmable radio in accordance with a preferred embodiment of the present invention. Another example of a radio that may be configured in accordance with the present invention can be found in patent application Ser. No. 09/080, 113 entitled, "COMMUNICATOR HAVING RECONFIGURABLE RESOURCES", filed on May 18, 1998, assigned to the same assignee as the present application, and is herein incorporated by reference.

In a preferred embodiment, "software programmable radio 200", generally comprises transceiver 202, controller 204, memory 206, at least one reconfigurable resource 208, display 214, input/output (I/O) port 216, and speaker/microphone 218. Preferably, reconfigurable resource 208 further includes processor 210 and memory 212. Processor 210 can be, for example, a digital signal processor (DSP) or a general purpose processor (GPP). In other embodiments, reconfigurable resource 208 includes other elements, such as, a transceiver and/or a field programmable gate array (FPGA). In one embodiment, the FPGA, alone or in combination with processor 210, performs processing steps such as programmed logic operations. Preferably, the element (e.g., FPGA) is coupled to controller 204 and processor 210.

In another embodiment, each reconfigurable resource 208 comprises memory 212, a transceiver, and optionally an FPGA and/or processor 210. Preferably, the transceiver is coupled to processor 210, memory 212, and the FPGA and functions like transceiver 202. In this embodiment, each transceiver for each reconfigurable resource is configured independently. For example, a transceiver for a first reconfigurable resource may be configured to perform as a CDMA telephone and a transceiver for a second reconfigurable resource may be configured to perform as a GSM telephone. Preferably, a transceiver is configured based on software programs and/or configuration information stored in memory 206 or received via a transceiver.

In a preferred embodiment, transceiver 202 receives information from network 100 through wireless communication channel 105. Transceiver 202 also transmits information from the radio such as, for example, encoded voice via a spread spectrum technique. Controller 204 receives information from transceiver 202 and preferably configures reconfigurable resource 208 to perform an operation based on the information. Additionally, controller 204 generates outputs (e.g., status, errors, software program icons) to a user through display 214 and receives inputs and generates outputs through I/O port 216 and speaker/microphone 218. In one embodiment, I/O port 216 is a keypad. In another embodiment, I/O port 216 is coupled to a touch screen (e.g., external display, display 214) or an electronic pen apparatus (not shown) that operates in cooperation with display 214, for example, the display receives inputs from the electronic pen. Preferably, when controller 204 associates a grant for a valid license with the operation, controller 204 enables reconfigurable resource 208 to perform the operation (e.g., software program). Controller 204 preferably performs a control program that is stored in memory 206. Memory 206 also includes a portion of memory for scratch for temporarily storing program information when controller 204 performs a control program. In a preferred embodiment, when information represents a grant of rights for use of a software defined waveform in accordance with a software license, controller 204 stores the information in memory 206. Additionally, when the information represents a software program to be performed by reconfigurable resource 208, the software program is preferably stored in a portion of memory 206 for applications (e.g., wireless email, software programmable waveform). Accordingly, when controller 204 loads an application software program into a reconfigurable resource, the application program is loaded from the application portion of memory 206 into memory 212 for the associated reconfigurable resource. Additionally, reconfigurable resource 208 receives audio inputs from and generates audio outputs to speaker/microphone 218.

In another embodiment, when reconfigurable resource 208 includes, for example, a field programmable gate array (not shown), information representing configuration data for the gate array is loaded by controller 204. Preferably, a second portion of memory 206 stores configuration files that are loaded into the gate array. Preferably, the gate array, in combination with processor 210 performs programmed logic and software programs, respectively, based on the information received by transceiver 202.

In another embodiment, radio 200 includes a plurality of reconfigurable resources 208. Each reconfigurable resource 208 is configurable to perform a separate processing operation. For example, a first reconfigurable resource 208 performs radio communications via a spread spectrum technique, a second reconfigurable resource 208 performs a wireless email operation via a proprietary technique, and a third reconfigurable resource 208 performs a file transfer via an analog technique.

In a preferred embodiment, information received by radio 200 represents, for example, a grant of rights to use software in accordance with a software license. Preferably each software program performed by processor 210 is associated with a grant of rights to use the software program. In other words, when a user of a radio uses a service provided by a software program stored in the radio, the software program is associated with a grant of rights to use the software in accordance with a software license. When controller 204 determines that a valid software license is granted for a software program stored in memory 206, controller 204 enables reconfigurable resource 208 to perform the software program. Similarly, information may represent, for example, a grant of rights for use of a software program to generate a waveform. When a user needs a particular radio waveform (e.g., analog, TDMA, CDMA, GSM, Iridium), controller 204 needs to associate a valid software license with the use of the waveform, wherein the waveform is generated from a software program performed by radio 200. Preferably, a grant of rights for use of software in accordance with a software license is also stored in a portion of memory 206.

In an alternative embodiment, information received by radio 200 via a wireless communication channel represents, for example, a software program. Preferably, a software program is performed by processor 210 as discussed above. Additionally, a software program is preferably associated with a grant of rights to use the software program in accordance with a software license.

In a preferred embodiment, processor 210 is a digital signal processor. The digital signal processor (DSP) preferably communicates a waveform through transceiver 202 in accordance with a software program. The software program performed by the DSP is preferably based on information received by transceiver 202. For example, the processor can perform an operation (e.g., software program) for encoding and decoding voice signals. In this example, the information represents a grant of rights for use of software in accordance with a license for a waveform to communicate the voice signals. In the same example, the information can represent any radio parameter (e.g., noninterference, splatter, noise, out-of-band noise) for communicating the waveform within FCC specifications for the radio.

In a preferred embodiment, processor 210 is a general purpose processor. The general purpose processor (GPP) preferably performs an operation (e.g., software program) based on information received by radio 200. For example, when information received by radio 200 represents an email message, the GPP performs a software program for receiving and displaying email. In another embodiment, the information can represent a grant of rights for use of a software program for communicating email in accordance with a software license. In yet another embodiment, the information can represent an update to a software program for communicating email.

In another preferred embodiment, radio 200 receives information representing a configuration file to configure, for example, a field programmable gate array (not shown). Preferably the gate array is part of reconfigurable resource 208 and is coupled to processor 210. In this example, a configuration file, is loaded by controller 204 from memory 206 to configure reconfigurable resource 208 to perform a logic operation associated with the information. In one example, the gate array is configured to perform a cryptographic operation (e.g., encryption, decryption, digital signature, hash) for additional information communicated by radio 200. Preferably, the processor performs a software program that provides input to and receives output from the gate array.

In another preferred embodiment, controller 204 compares a first portion of the information with a first part of a configuration file stored in memory 206 to determine when the reconfigurable resource supports the operation associated with the information. In this embodiment, comparing a first portion of the information with a first part of a configuration file is preferably used to verify an operation to be performed by a radio at a remote location.

Figure 3:
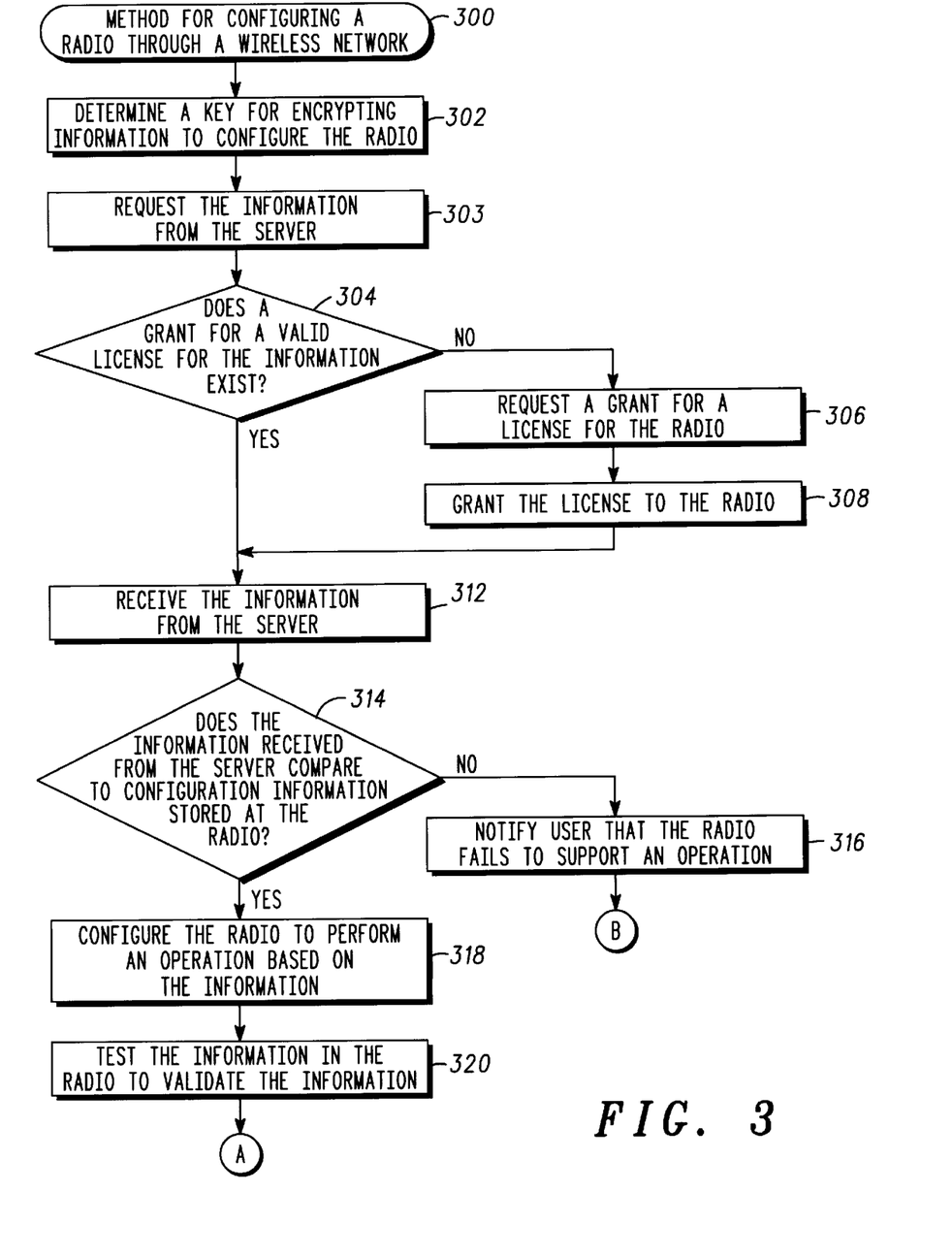
FIG. 3 and FIG. 4 show a simplified flow chart for a method for configuring a software programmable radio for communicating through a wireless network in accordance with a preferred embodiment of the present invention.
Figure 4:
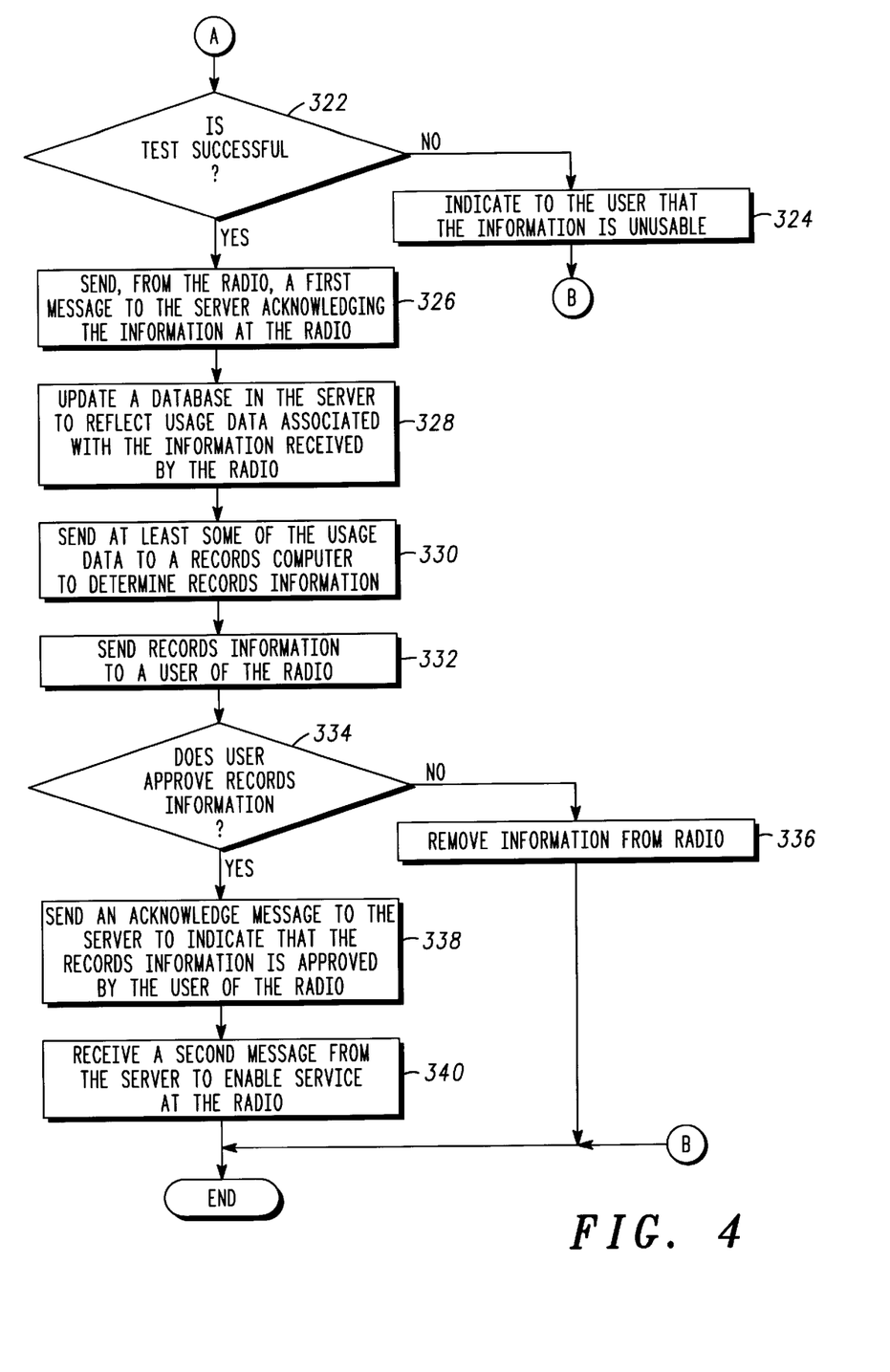

FIG. 3 and FIG. 4 show a simplified flow chart for a method for configuring a software programmable radio for communicating through a wireless network in accordance with a preferred embodiment of the present invention. Method 300 may be used to configure radio 200 (FIG. 1), and to communicate through wireless network 100 (FIG. 1). In general, method 300 includes steps for dynamically configuring a radio to perform communications in a wireless network. In a preferred embodiment, the wireless network provides information to a radio to configure the radio. Preferably method 300 is performed by a radio, and when specified, elements of a wireless network.

In step 302, a key for encrypting information is determined. In a preferred embodiment, each pair of elements determines a key for encrypting and decrypting information communicated between the elements. For example, a radio is coupled to a base station via a wireless communication channel. The radio and the base station each determine a key or keys for encrypting and decrypting information communicated between the elements. Examples of keys include symmetric key and public-private key pairs. Keys are determined similarly between other pairs of elements (e.g., a base station and a server). Preferably, keys are distributed using over-the-air rekey (OTAR), however other methods for determining and distributing keys are possible, for example, dynamically determining a session key between elements, distributing keys via a public-key infrastructure hierarchy, storing keys on and loading keys from magnetic media.

In step 303, the information is requested from the server. In a preferred embodiment, the radio requests the information to configure the radio. For example, when a user of a radio needs to add a software program, the user sends a message to the server to request the software program. One example of a message used to send a request for information in a wireless network is a short message service (SMS) message.

In step 304, a check is performed to determine when a grant of rights for use of software in accordance with a valid license for the information exists. In a preferred embodiment, when the information communicated in step 302 represents information (e.g., software program, software defined waveform) to be associated with a license, a check is performed to determine when the license has been granted. In a preferred embodiment, when a grant of rights exists, the grant of rights is stored in the radio. In an alternative embodiment, when a grant of rights exists, the grant of rights is stored in the server. When a license is needed but has not been granted to the radio, step 306 is performed. Otherwise, step 312 is performed. In an embodiment where no license is associated with the information (e.g., when the information is the software license) steps 304–308 are preferably not performed.

In step 306, a request for a grant of rights for use of software in accordance with a license is communicated from the radio. In a preferred embodiment, the radio sends a message to the server to request a grant of rights.

In step 308, the license is granted to the radio. In a preferred embodiment, when a user of a radio requests a license, the server grants the license. Preferably, the server checks the user identification (ID) or radio ID to determine when to grant the license. The grant for the license may be stored in the radio, the server, or another element in the wireless network. In another embodiment, a license is not granted to the radio. For example, when a radio is reported as lost or stolen, an administrator for the wireless network may reject service for the radio by modifying usage data in the records computer to reflect a change in status (e.g., lost or stolen) for the radio.

In step 312, the information is received from the server. In a preferred embodiment, the information requested by the radio is received at the radio. For example, a radio receives a software program for implementing a waveform, a grant of rights for use of software in accordance with a license, or a configuration file that was requested in step 303.

In step 314, a comparison is made between the information received from the server and configuration information stored at the radio. For example, when information such as a configuration file for a software defined waveform is received at the radio, the radio performs a check to determine when the radio is capable of producing the waveform. In other words, the controller for the radio needs to confirm that the hardware for the radio is capable of generating the waveform determined by the configuration file. When the check fails to be successful, step 316 is performed. Otherwise, step 318 is performed.

In step 316, a user is notified that the radio fails to support an operation. In a preferred embodiment, when the radio is not capable of servicing a request from the user, the radio notifies the user through a message output to the radio's display. When step 316 is complete, the method ends.

In step 318, the radio is configured to perform an operation. In a preferred embodiment, the radio is configured to perform the operation associated with the information. For example, when the information represents a grant of rights for use of software in accordance with a license for a software defined waveform, the controller for the radio loads a program for performing the waveform into a memory of a reconfigurable resource. Subsequently, the processor performs the software program to generate the waveform. In another embodiment, a configuration file is loaded into a reconfigurable resource to configure a field programmable gate array for generating a waveform. In a preferred embodiment, a radio is configured by loading a software program into a memory for a reconfigurable resource, and/or loading a configuration file into a field programmable gate array for a reconfigurable resource.

In step 320, the information is tested to validate the information. In a preferred embodiment, when information loaded into a radio is verifiable, the information is tested to check the information. For example, when a cellular phone is operated in the United States (e.g., home location), the phone may be configured to operate as a CDMA phone. When the phone is operated in Europe (e.g., remote location), the phone may be configured to operate as a GSM phone. In this example, the phone is configured for use as a GSM phone prior to the user departing from the home location. In this embodiment, testing the information includes, for example, performing a hash operation on the software program that operates the GSM phone. The test is to compare the result of the hash to a predetermined hash for the software program. In another embodiment, step 320 includes, when possible, operating a radio using configuration information for the service to be performed at the remote location.

In step 322, a check is performed to determine when the test is successful. In a preferred embodiment, when a test is successful, step 326 is performed. Otherwise, step 324 is performed. For the example discussed in step 320, when the hash determined for the software program matches the predetermined hash for the software program, the test is successful. In another embodiment, a test is successful when the radio is configured and operated (e.g., test message sent and received by the radio) using the information received in step 312.

In step 324, a user is notified that the information is unusable. In a preferred embodiment, when the test performed in step 322 is unsuccessful, the user is notified that the radio failed to be configured. Preferably, the radio indicates the failure to configure the radio via a display for the radio.

In step 326, a message is sent to acknowledge the information at the radio. In a preferred embodiment, when the information is received and verified by the radio, the radio communicates an acknowledge message to the server.

In step 328, update a database to reflect usage data associated with the information received by the radio. In a preferred embodiment, the server updates a database to reflect the information received by the radio.

In step 330, send at least some of the usage data to the records computer. In a preferred embodiment, the server forwards a message to the records computer to reflect at least some of the information received by the radio. For example, the server may track software programs currently in use by a radio and a records computer may track the total number of uses of a software program since the grant of rights for use of the software program in accordance with a license. So, the server reports "another" use of the information by the radio to the records computer.

In step 332, records information is sent to a user or service provider of the radio. In a preferred embodiment, records information includes billing data for a commercial use (e.g., cellular telephony) of the information. In another embodiment, records information includes data for proprietary use (e.g., police radios). For example, when a law enforcement official is traveling to a remote location, the official may need a status indicator that the official's radio is approved for use at a remote location. In the embodiment for commercial use, the user of the radio may desire to receive billing data for a service prior to using the service.

In step 334, a check is performed to determine when a user approves the records information. In a preferred embodiment, when a user for a radio approves records information, step 338 is performed. When a user fails to approve records information, the information received in step 312 is removed in step 336. When step 336 is complete, method 300 ends.

In step 338, a message is sent to the server to acknowledge that the records information is approved by a user. In a preferred embodiment, the user approves the records information received from the records computer. Preferably, the user of the radio inputs an "accept" sequence to acknowledge the records information at the radio. Accordingly, an acknowledge message is sent from the radio to the server and then to the records computer to indicate that the user approves the records information.

In step 340, a message is received from the server to enable service at the radio. In a preferred embodiment, when the server sends an enable message to the radio, the controller for the radio enables a reconfigurable resource associated with the information. In other words, the configuration operation performed in step 318 is enabled. When the service is enabled at the radio, the method ends. In another embodiment, steps 320–340 are optional. In this embodiment, the radio is enabled when step 318 is complete.

Thus, what has been shown are a radio and method to perform radio communications at a remote location. What has also been shown are a radio and method to communicate different waveforms. Also shown is a method to simply and inexpensively update and receive a software application for a radio. What has also been shown is a radio that interoperates with various communications equipment. Also shown are a radio and method for communicating via various communication techniques. What has also been shown are a radio and method for verifying when the radio will operate at predetermined specifications when performing communication operations.

Thus, a radio and method have been described which overcome specific problems and accomplish certain advantages relative to prior art methods and mechanisms. The improvements over known technology are significant. The expense and complexities for manually configuring a radio are avoided. Similarly, the inconvenience of needing multiple devices to communicate in different communication systems is removed. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for configuring a radio with software for communicating in a wireless network, the method comprising the steps of:

requesting configuration information for communicating in said wireless network with one of a plurality of waveforms, the wireless network checking for a valid communication license for the radio associated with said one waveform receiving the configuration information from the network for said one waveform when the network has determined that the radio has said valid communication license for use of said waveform; and configuring the radio in accordance with the configuration information, said configuration information allowing the radio to communicate in the wireless network using said waveform.

2. A method as claimed in claim 1, further comprising the steps of:

sending, from the radio, a first message to the server acknowledging receipt of the configuration information at the radio; and receiving a second message from the server to enable the operation at the radio for communication within the wireless network using said one waveform.

3. A method as claimed in claim 1, further comprising the steps of:
   determining a key for decrypting the configuration information; and
   decrypting the configuration information using the key.

4. A method for configuring a radio for communicating in a wireless network, the method comprising the steps of:
   checking for a valid license associated with information to configure the radio;
   receiving the information from a server when the valid license is granted to the radio;
   configuring the radio to perform an operation based on the information;
   comparing, in the radio, a first portion of the information with a first part of a configuration file to determine when the radio supports the operation associated with the information; and
   testing the information in the radio to verify that the radio is capable of performing the operation.

5. A method for configuring a radio for communicating in a wireless network, the method comprising the steps of:
   checking for a valid license associated with information to configure the radio;
   receiving the information from a server when the valid license is granted to the radio;
   configuring the radio to perform an operation based on the information;
   updating a database in the server to reflect usage data associated with the information received by the radio; and
   sending at least some of the usage data to a records computer to determine records information.

6. A method as claimed in claim 1, further comprising the steps of:
   when said software program is enabled, providing billing data to a user of the radio, the billing data comprising a fee for use of said software program; and
   sending an acknowledge message to the wireless network to acknowledge that the billing data is approved by the user of the radio.

7. A method as claimed in claim 1, wherein in the receiving step, the configuration information enables a software program to be performed by the radio, the software program configuring the radio communicate in the wireless network using said waveform, and
   the method further comprises the steps of:
      determining when a valid software license has been issued to said radio, the software license being associated with said software program, the software license being a grant of rights from a licensor of said software program; and
      refraining from performing the configuring step when the valid software license has not been issued to the radio.

8. A method as claimed in claim 7, wherein the receiving step, the configuration information further comprises said software program, and wherein the configuring step includes the step of loading the software program into the radio to configure the radio to communicate using said waveform, the configuration information further including requirements of the software license including a time period the radio is permitted to communicate using the waveform.

9. A method as claimed in claim 1, wherein
   said valid communication license comprises permission to use of said waveform and has been issued by a governmental body for regulation of wireless communications, and
   wherein the configuration information identifies a set of communication specifications for communicating in the wireless network, the communication specifications comprising non-interference, splatter, noise and out-of-band rejection requirements.

10. A method as claimed in claim 7, wherein when said valid software license does not exist for the radio, the method further comprises the steps of:
    requesting a software license for use of the software program; and
    refraining from performing the configuring step until the radio is granted the software license.

11. A software programmable radio comprising:
    a transceiver for receiving encrypted configuration information through a wireless network;
    a reconfigurable resource for generating a waveform in accordance with a software program, the waveform being one of a plurality of waveforms determined based on the configuration information; and
    a controller to configure the reconfigurable resource in accordance with the configuration information to perform the software program when the controller associates a valid communication license for said one waveform.

12. A software programmable radio as claimed in claim 11, wherein said valid communication license comprises permission to use of said one waveform and has been issued by a governmental body for regulation of wireless communications, and wherein the reconfigurable resource further comprises:
    a memory having said software program stored therein; and
    a processor to perform the software program to generate the one waveform.

13. A software programmable radio as claimed in claim 12, wherein the processor comprises a digital signal processor, the digital signal processor subsequently communicates said one waveform through the transceiver in accordance with the software program.

14. A software programmable radio as claimed in claim 12, wherein the memory stores a grant of rights for use of the software program in accordance with a software license.

15. A software programmable radio comprising:
    a transceiver to receive information through a wireless network;
    a reconfigurable resource to perform an operation based on the information; and
    a controller to configure the reconfigurable resource to perform the operation when the controller associates a valid license with the operation,
    wherein the controller further comprises means for comparing a first portion of the information with a first part of a configuration file to determine when the reconfigurable resource supports the operation associated with the information.

16. A method for communicating using a software programmable radio, the method comprising the steps of:
    requesting the granting of a communication license to use a waveform within a wireless network, the waveform being defined by a software program stored within said radio;
    receiving the grant of communication license at the radio, the grant of license identifing rights and restrictions for communication within the wireless network using the waveform;

loading the software program into the radio in response to the receipt of the license grant;

performing, by a processor in the radio, the software program to generate the waveform; and communicating within the wireless network using the waveform through a transceiver in the radio.

\* \* \* \* \*